Patented Jan. 29, 1924.

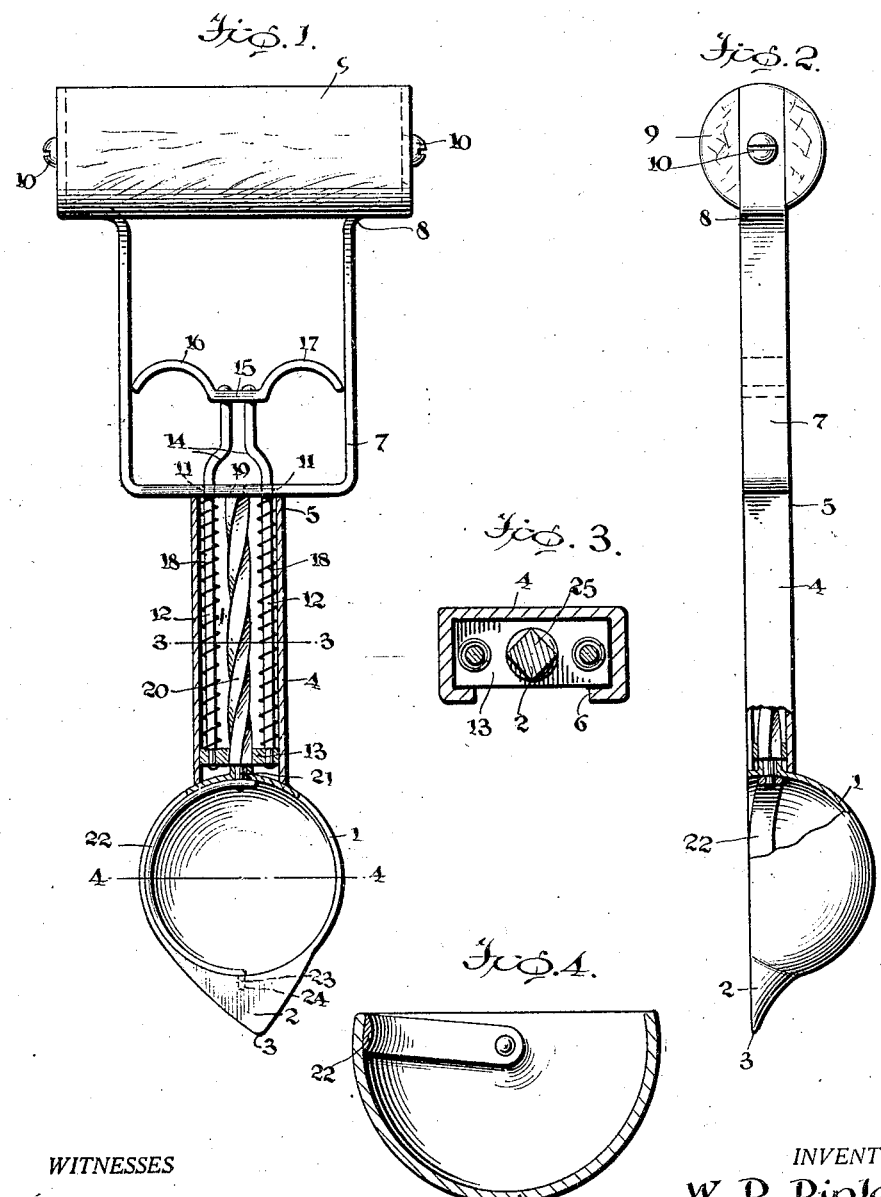

1,482,094

UNITED STATES PATENT OFFICE.

WILLIAM RODDIE RIPLEY, OF MODESTO, CALIFORNIA.

ICE-CREAM DIPPER.

Application filed March 5, 1923. Serial No. 622,991.

*To all whom it may concern:*

Be it known that I, WILLIAM R. RIPLEY, a citizen of the United States, and resident of Modesto, in the county of Stanislaus and State of California, have invented certain new and useful Improvements in Ice-Cream Dippers, of which the following is a specification.

My invention relates to improvements in ice cream dippers, and consists in the combinations, constructions and arrangements herein described and claimed.

More specifically, the present invention is an improvement over the ice cream dipper disclosed in my co-pending application for Letters Patent of the United States, Serial No. 596,839, filed October 25th, 1922, patented Oct. 30, 1923, No. 1,472,533.

In my aforesaid application for Letters Patent of the United States, I disclosed an ice cream dipper including a bowl having a guide lip at its forward edge for guiding the bowl into a frozen mass, the dipper also including a scraper working in the bowl and a spring pressed finger operable rack bar and pinion arrangement for operating the scraper element.

An object of the present invention is to improve the construction of an ice cream dipper of the character described in such manner as to provide a dipper which is extremely simple in construction, economical to manufacture, easy to operate, and thoroughly practical commercially.

A further object of the present invention is to provide an ice cream dipper of the character described which comprises but relatively few parts, all portions of which are readily accessible for the purpose of cleaning, whereby the dipper satisfies all sanitary requirements for an article used in the service for which it is intended.

A still further object of the invention is to provide an ice cream dipper of the character described which embodies a novel means for operating the scraper element for dislodging frozen cream or like substances from the bowl of the dipper.

Other objects and advantages will be apparent from the following description, considered in conjunction with the accompanying drawings, in which—

Figure 1 is a plan view of a dipper embodying the present invention, portions thereof being broken away and other portions being shown in section, Figure 2 is a side elevation of the dipper with portions thereof broken away and other portions shown in section, Figure 3 is a section along the line 3—3 of Figure 1, and Figure 4 is a section along the line 4—4 of Figure 1.

As shown in the drawings, my improved dipper includes a bowl or spoon 1 which is substantially hemispherical in form, as is usual in ice cream dippers, and which is formed with an integral laterally extending substantially wedge-shaped guide lip or pilot 2, the upper face of the guide lip or pilot being substantially flat and lying in the plane of the upper edge of the bowl while the under face of the guide lip is convexly curved and the guide lip tapers in width and thickness from its juncture with the bowl to the outer end thereof. Therefore, the guide lip 2 terminates at its outer end in a point, as indicated at 3.

A guide section 4 of a frame or body designated generally at 5 extends radially from the side of the spoon or bowl opposite that provided with the guide lip 2. The guide section 4 is by preference formed integrally with the bowl 1 and is substantially channel-shaped in cross sectional contour, the under side thereof being open for part of its width as indicated at 6 and as best seen in Figure 3. The body or frame 5 also includes a substantially U-shaped section 7, the web portion of which is disposed transversely of the guide section 4 at the rear end of the latter and extends laterally of opposite sides of the guide section so that the arms of the U-shaped section extend in parallel relation to the sides of the guide section and respectively in planes equidistant from the adjacent sides of the guide section. The arms of the U-shaped body or frame section are offset outwardly adjacent to their rearward or outer ends, as indicated at 8 and embrace the ends of a grip member 9 which is shown as being circular in cross sectional contour. The rearward or offset end portions of the arms of the U-shaped section are secured to the ends of the grip member 9 by screws 10 or like fastening means, whereby the grip member will be disposed in spaced parallel relation to the web portion of the U-shaped body section.

The portion of the web of the U-shaped section that spans the sides of the channel-shaped guide section 4 is formed with a pair of aligned openings 11 therethrough adjacent to the sides of the guide section and through these openings slidably extend slide rods 12. The latter are secured at their inner ends to a block 13 which is disposed within the guard section 4 and is slidable longitudinally of the latter. The slide rods 12 are offset inwardly adjacent to their rearward ends, as indicated at 14 to provide stops for engaging the rearward face of the web portion of the U-shaped section 7 to limit the forward movement of the guide rods within the channel-shaped guide section. The offset rearward end portions of the slide rods are secured at their extremities to a finger piece 15. The latter may be a bar secured at points equi-distant from its opposite ends to the rear ends of the slide rods and being curved arcuately at opposite sides of the slide rods, as indicated at 16 and 17 respectively for engagement with the second and third fingers of a hand grasping the grip member 9.

With the arrangement described, the first and fourth fingers of the hand of the operator grasping the grip member may slide along the outer sides of the arms of the U-shaped section 7 while the second and third fingers of the hand exert a pull against the curved portions 16 and 17 of the finger piece, whereby the slide rods 12 and the block 13 will be pulled rearwardly or toward the grip member 9. Expansion springs 18 coiled about the slide rods 12 between the web portion of the U-shaped frame and the block 13 act to move the slide rods and block forwardly when pressure on the finger piece 15 is relaxed, the forward movement of the slide rods and block being terminated when the stop portion 14 of the slide rods contact the web portion of the U-shaped body section.

The web portion of the U-shaped body section is provided with an opening 19 located midway between the openings 11—11 and in this opening is journaled one end portion of a screw 20, the other end portion of which is journaled in an opening 21 formed through the proximate sides of the bowl or spoon 1. The end of the screw 20 is secured in any suitable known manner to one end of a scraper member 22 of usual form and adapted to work in the bowl or spoon 1 in close sliding engagement with the inner walls of the latter, the end of the scraper 22 opposite that secured to the screw being provided with an outwardly extending journal projection 23 disposed in a socket or aperture 24 in the inner wall of the bowl or spoon, the journal projection 23 being in axial alignment with the screw 20.

The block 13 is provided with a grooved bore 25 adapted for sliding engagement with the screw 20.

From the foregoing description of the various parts of the device, the operation thereof may be readily understood. The screw 20 may be a bar or rod having the end portions thereof circular in cross sectional contour to provide a journal as described and being square in cross sectional contour at all points intermediate the journal portion, the bar being twisted to provide the spirally extending threads shown, which spirally extending threads engage with the grooves in the bore 25 of the block. Since the block 13 is held against rotation because of its connection with the slide rods 12 which slidably extend through the openings 11 and because of its engagement with the inner walls of the channel-shaped guide section, it will be obvious that movement of the slide block 13 longitudinally of the guide section will cause rotation of the screw 20 about its axis. Such movement of the screw will cause the scraper 22 to swing in close sliding contact with the inner wall of the bowl 1 whereby any matter disposed in the latter will be dislodged and ejected therefrom.

It is intended that rearward movement of the block 13 in response to pressure of fingers on the finger piece 15 will occasion swinging movement of the scraper 22 from the position illustrated in the drawings. When the pressure on the finger piece 15 is relaxed, the springs 18 will act to return the block to the position illustrated in the drawings and the scraper 22 will thus be moved to the position shown.

The scraper can be operated with but slight muscular exertion and the means provided for operating the scraper is not likely to get out of order easily.

Since the under side of the guard section 4 is partially cut away, access to the interior of the guard section and to the parts working therein may be had for the purpose of cleaning such parts. There is no inaccessible place in the device in which dirt or the like may lodge and remain when the device is cleaned, as by washing.

The guard lip or pilot 2 is adapted to enter a mass of frozen cream or the like and to guide the bowl into the mass, no matter how compact or hard the latter may be.

Obviously, my invention is susceptible of embodiment in forms other than that illustrated in the accompanying drawings and I therefore consider as my own all modifications and adaptations of the form of the device disclosed herein which fairly fall within the scope of the appended claims.

I claim:

1. An ice cream dipper comprising a substantially hemispherical bowl, a body extending radially from the bowl and comprising an inner section of substantially channel-shape in cross sectional contour and having one side thereof partially cut-away and a substantially U-shaped outer section having the arms thereof disposed in parallel relation to the sides of the channel-shaped section respectively and disposed outwardly of opposite sides of the channel-shaped section, a grip member spanning the ends of the arms of the U-shaped section, a screw extending within the channel-shaped section longitudinally of the latter and having one end thereof journaled in the web of the U-shaped section and the other end thereof journaled in the walls of the bowl, a block slidably received within the channel shaped section and having a bore in sliding engagement with the screw, slide rods secured at their inner ends to said block and extending through openings in the web of the U-shaped section between the arms of the latter, a finger piece carried at the outer ends of said slide rods, a scraper adapted to work in the bowl and secured to the inner end of the screw and spring means reacting against said block to urge the latter toward the inner end of said channel-shaped section.

2. An ice cream dipper comprising a substantially hemispherical bowl, a body extending radially from the bowl and comprising an inner section of substantially channel-shape in cross sectional contour and having one side thereof partially cut-away and a substantially U-shaped outer section having the arms thereof disposed in parallel relation to the sides of the channel-shaped section respectively and disposed outwardly of opposite sides of the channel-shaped section, a grip member spanning the ends of the arms of the U-shaped section, a screw extending within the channel-shaped section longitudinally of the latter and having one end thereof journaled in the web of the U-shaped section and the other end thereof journaled in the walls of the bowl, a block slidably received within the channel shaped section and having a bore in sliding engagement with the screw, slide rods secured at their inner ends to said block and extending through openings in the web of the U-shaped section between the arms of the latter, a finger piece carried at the outer ends of said slide rods, a scraper adapted to work in the bowl and secured to the inner end of the screw, spring means reacting against said block to urge the latter toward the inner end of said channel-shaped section, and a wedge-shaped projection extending from the marginal edge of the bowl and being located opposite the inner end of the body.

3. An ice cream dipper comprising a bowl having an opening through the side walls thereof adjacent to the edge thereof, a scraper adapted to work in the bowl, a rotatable screw extending through the opening and secured at its inner end to the scraper for operating the latter, a frame extending radially from the bowl and having a guideway through which the screw extends, a block slidable along the guideway and held against rotation therein, said block having a bore in sliding engagement with said screw, a grip member disposed at the outer end of the frame in spaced relation to the outer end of the guideway, a finger piece adjacent to said grip member, and a slide rod connecting said finger piece to said slide block.

WILLIAM RODDIE RIPLEY.